(12) United States Patent
Wong

(10) Patent No.: US 6,888,371 B2
(45) Date of Patent: May 3, 2005

(54) PROGRAMMABLE INTERFACE FOR FIELD PROGRAMMABLE GATE ARRAY CORES

(75) Inventor: Dale Wong, San Francisco, CA (US)

(73) Assignee: Leopard Logic, Inc., Cupertino, CA (US)

( * ) Notice: Subject to any disclaimer, the term of this patent is extended or adjusted under 35 U.S.C. 154(b) by 73 days.

(21) Appl. No.: 10/283,019

(22) Filed: Oct. 29, 2002

(65) Prior Publication Data

US 2003/0098710 A1 May 29, 2003

Related U.S. Application Data

(60) Provisional application No. 60/345,115, filed on Oct. 29, 2001.

(51) Int. Cl.[7] ............................................. H03K 19/173
(52) U.S. Cl. ............................... 326/38; 326/41; 326/47
(58) Field of Search ............................... 326/37–41, 46, 326/47

(56) References Cited

U.S. PATENT DOCUMENTS

| | | | |
|---|---|---|---|
| 5,483,178 A | 1/1996 | Costello et al. | 326/41 |
| 5,600,264 A | 2/1997 | Duong et al. | 326/39 |
| 5,889,413 A | 3/1999 | Bauer | 326/40 |
| 5,905,385 A | 5/1999 | Sharpe-Geisler | 326/39 |
| 5,960,191 A * | 9/1999 | Sample et al. | 703/28 |
| 6,014,038 A * | 1/2000 | How et al. | 326/46 |
| 6,191,612 B1 * | 2/2001 | Agrawal et al. | 326/39 |

* cited by examiner

*Primary Examiner*—Don Le
(74) *Attorney, Agent, or Firm*—Ritter, Lang & Kaplan LLP

(57) ABSTRACT

A programmable interface for FPGA cores embedded in an integrated circuit. The interface has an interconnect multiplexer (which includes demultiplexers) connected to the FPGA core and other elements of the integrated circuit. A control portion of the interface provides selection control bits to the interconnect multiplexer to make the desired connection configuration. Programmable latches in the control portion hold the selection bits which are loaded into the latches at the same time configuration bits are loaded into the integrated circuit to program the FPGA core. Alternatively, the control portion can be implemented by another FPGA core which is configured as a state machine to generate the selection control bits.

24 Claims, 3 Drawing Sheets ary elements of a parallel computing integrated circuit, for example. The main configurable portion of the FPGA, termed an FPGA core, is embedded in the ASIC to configurably interconnect the various functional circuit blocks of the ASIC or to form another functional circuit block of the integrated circuit. This block is programmable by the user (or the manufacturer of the ASIC) to make the integrated circuit flexible in its application.

PROGRAMMABLE INTERFACE FOR FIELD PROGRAMMABLE GATE ARRAY CORES

CROSS-REFERENCES TO RELATED APPLICATIONS

This patent application claims priority from U.S. Provisional Patent Application No. 60/345,115, filed Oct. 29, 2001, and which is incorporated herein for all purposes.

BACKGROUND OF THE INVENTION

The present invention is related to configurable interconnection networks in integrated circuits and, in particular, to the FPGA (Field Programmable Gate Array) cores which are embedded in integrated circuits. The FPGA core can provide configurable interconnections between functional circuit blocks, particularly a computing element such as processor core, or itself provide a configurable functional circuit block, in the integrated circuit.

An FPGA is an integrated circuit with logic cells and an interconnection network between the logic cells which are both configurable so that the function of the FPGA is adapted to a user's application. The user programs the integrated circuit for his or her application and hence the term, "field programmable." For FPGAs based on SRAM (Static Random Access Memory) cells to hold the configuration bits, the configuration of the FPGA can be changed by the user for multiple applications of the electronic system. For configurable cores based on single-mask customization, the FPGA can only be configured once by the user.

With shrinking geometries in semiconductor technology, FPGAs are beginning to be embedded with functional circuit blocks in ASICs (Application Specific Integrated Circuits). Such blocks may include a processor, memory, and peripheral elements in a so-called System-on-a-Chip (SOC), or even multi-processor elements of a parallel computing integrated circuit, for example. The main configurable portion of the FPGA, termed an FPGA core, is embedded in the ASIC to configurably interconnect the various functional circuit blocks of the ASIC or to form another functional circuit block of the integrated circuit. This block is programmable by the user (or the manufacturer of the ASIC) to make the integrated circuit flexible in its application.

Heretofore, FPGA cores have been embedded into an ASIC with conventional, i.e., "hard-wired," interconnects wiring to other functional circuit blocks according to the particular design of the ASIC. Given the flexible nature of an ASIC with one or more FPGA cores, it is possible that the application of the ASIC may change. The FPGA cores may be reprogrammed but the wiring remains, interfering partially or completely with the ASIC's adaptability to the new application.

The present invention is directed toward this problem and offers an effective way of adding even more flexibility to embedded FPGA cores.

SUMMARY OF THE INVENTION

The present invention provides for a programmable interface for an FPGA core embedded in an integrated circuit. The programmable interface is capable of selectably connecting the FPGA core to one of many elements of the integrated circuit in different connection configurations, and has at least one multiplexer connected to the FPGA core and to a plurality of elements of the integrated circuit. The multiplexer, which includes a reverse multiplexer, i.e., a demultiplexer, selectably connects the FPGA core to one of the elements in response to a control portion of the interface. The control portion has at least one programmable latch connected to the one multiplexer to provide selection bits to the one multiplexer so that reprogramming the programmable latch changes the multiplexer to connect the FPGA core to another of the plurality of integrated circuit elements. These elements can include functional circuit blocks, such as buffer memory blocks, a second FPGA core, or even input/output pins. By using a clocked signal in the control portion, it is possible to change the selection bits provided by the programmable latch so that the programmable interconnect provides a dynamically changing connection configuration without reprogramming the programmable latch.

The control portion can also be implemented by another FPGA core which is configured as a state machine to generate selection bits for the multiplexer.

The present invention also provides for a method of defining the different connection configurations by loading the selection bits into the at least one programmable latch in the same operation of loading configuration bits into the integrated circuit to program the embedded FPGA core. In the case of the control portion of the programmable interface implemented by an FPGA core, the different connection configurations are defined by loading configuration bits for the control portion FPGA core in the same operation of loading configuration bits into the integrated circuit to program the embedded FPGA core to be connected.

DESCRIPTION OF THE SPECIFIC EMBODIMENTS

Figure 1:
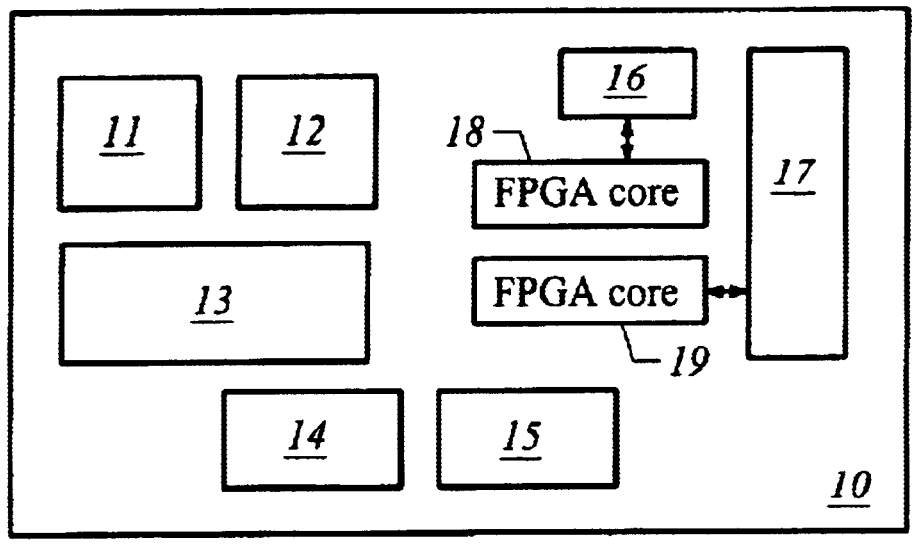
FIG. 1 is a representational block diagram of an integrated circuit with two FPGA cores.

FIG. 1 is a representation of an exemplary organization of an ASIC 10 with various functional circuit blocks 11–17 interconnected with two FPGA cores 18 and 19. As shown in the drawing, the FPGA core 18 is connected to the functional circuit block 16 and core 19 to the functional circuit block 17. The functional circuit blocks may be a processor unit, memory, specialized function blocks, such as a floating point unit, or even another FPGA core, and the like. For purposes of generalization in this explanation, the particular functions of the blocks 11–17, nor of the cores 18 and 19, are undefined. Examples of functional circuit blocks are given below for application examples of the present invention.

As mentioned previously, a change in application may render the function of the designed ASIC 10 inadequate or unsatisfactory. To save the costs and delay of a redesign of a new ASIC, a reprogramming of the ASIC 10 might be considered. However, while the FPGA cores 18 and 19 may be reconfigured in reprogramming the ASIC 10, the reconfigured cores may operate more effectively, or may require, that the core 18 be connected now to the functional circuit block 17 and the core 19 to the functional circuit block 16, or connected to the other functional circuit blocks. With conventional hard-wired interconnections, such reconnections of the FPGA cores are not possible.

Figure 2:
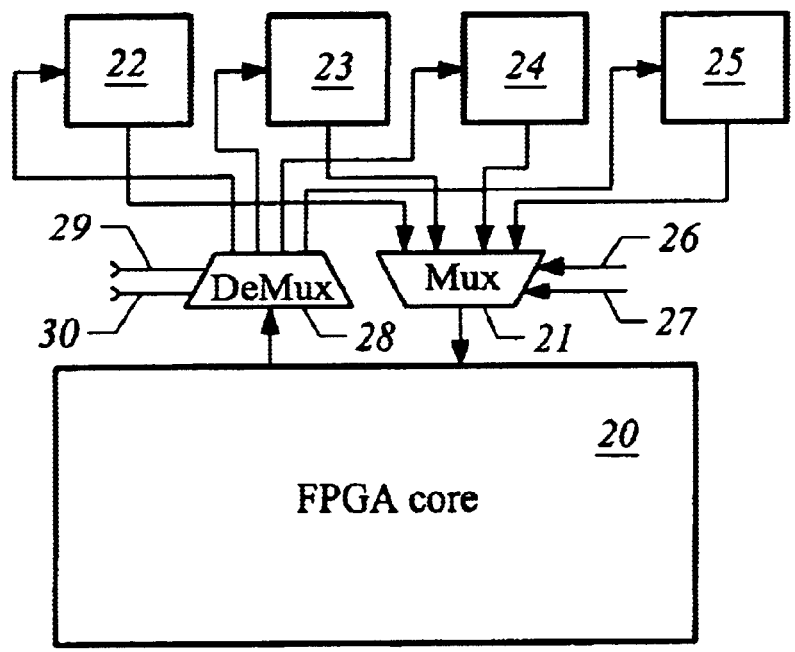
FIG. 2 shows a block diagram of a programmable interface for an FPGA core, according to one embodiment of the present invention.

On the other hand, the present invention permits these connections to be made with programmable interfaces for FPGA cores. FIG. 2 illustrates an FPGA core 20 with an exemplary programmable interface, according to one embodiment of the present invention. In this example, an FPGA core 20 has an interconnect multiplexer 21 which handles input connections into the core 20. The multiplexer 21 is connected to four functional circuit blocks 22–25. To make the selection of functional circuit blocks 22–25, the multiplexer 21 is responsive to control signals on control Select Bit lines 26 and 27. It should be understood that the connection lines between the functional circuit blocks 22–25 and the multiplexer 21, and between the multiplexer 21 and the FPGA core 20 each represent a plurality of parallel connection lines carrying multiple bits simultaneously. Likewise, the interface has an interconnect demultiplexer 28 to handle output connections of the FPGA core 20 to the functional circuit blocks 22–25. Control signals on control Select Bit lines 29 and 30 to the demultiplexer 28 selects which of the functional circuit blocks 22–25 receives the output from the FPGA core 20.

The control signals to the interconnect multiplexers, demultiplexers being a form of multiplexers, of the FPGA core programmable interface are supplied by a programmable control portion of the interface. In the immediately following embodiments of the present invention, the control bits are held as Select Bits in programmable latches which are connected to the control signal lines of the interface multiplexers. The latches are loaded during the loading of the configuration bits which set the state of switches in the FPGA logic and interconnection paths. Alternatively, if the ASIC includes a CPU, the ASIC can be designed so that the CPU can load the latches with the control Select Bits. The configuration bits program one or more of the FPGA cores and the control Select Bits for the programmable interfaces set the connections to and from the FPGA cores.

Figure 3:
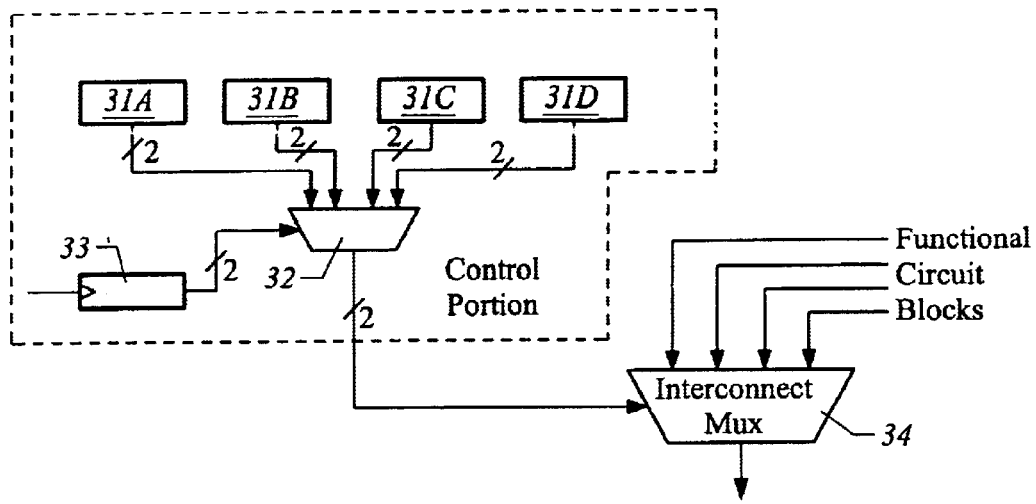
FIG. 3 illustrates the control portion of the programmable interface with a circular buffer of latches, according to an embodiment of the present invention.

FIG. 3 illustrates one embodiment of the interface control portion, a circular buffer of four latches 31A–31D which feed into a selection multiplexer 32 controlled by a counter 33. The 2-bit latches 31A–31D in this example hold different combinations of 1's and 0's as control Select Bits. The counter 33 provides the control signals by which the multiplexer 32 selects the two control bits for an FPGA core interconnect multiplexer 34. Depending upon which latch 31A–31D provides the control Select Bits, the multiplexer 34 selects, in this example, the outputs of one of four functional circuit block to connect to the inputs of an FPGA core. Conversely, again depending upon which latch 31A–31D is providing the control signals, the multiplexer 34 in a demultiplexer form selects which functional circuit block receives the outputs of an FPGA core. With the clocking of the counter 33, the programmable interface periodically changes the FPGA core interconnections without loading the latches. The FPGA core interconnections are changed dynamically.

Figure 4:
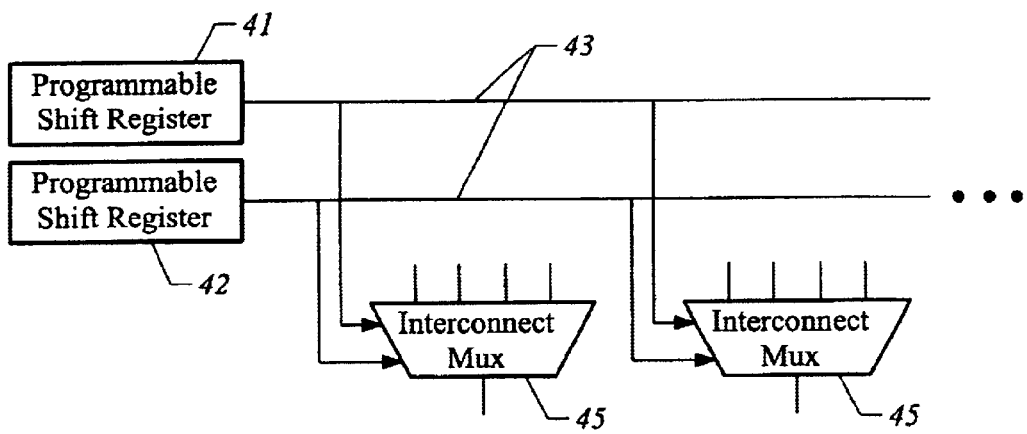
FIG. 4 illustrates the control portion of the programmable interface with programmable shift registers, according to another embodiment of the present invention.

Rather than simple latches in the control portion of the programmable interface, programmable shift registers are preferred because fewer transistors are required to implement shift registers and less silicon area is occupied on the integrated circuit surface. Each programmable shift register provides a control Select Bit of the interconnect multiplexers to be controlled. FIG. 4 illustrates one example with programmable shift registers 41 and 42 to control the interconnect multiplexers 45 of an FPGA core interface. The interconnect multiplexers 45 are arrayed in banks which are to be controlled as a single switching unit (e.g., 32 interconnect multiplexers arrayed to select a 32-bit bus), the select control lines 43 and 44 for each interconnect multiplexer 45 in the bank are shared and the controlling programmable shift registers 41 and 42 are likewise shared. As the control Select Bits are shifted in the shift registers 41 and 42, the interconnect multiplexers 45 dynamically reconfigure their connections between functional circuit blocks and FPGA cores.

Figure 5A:
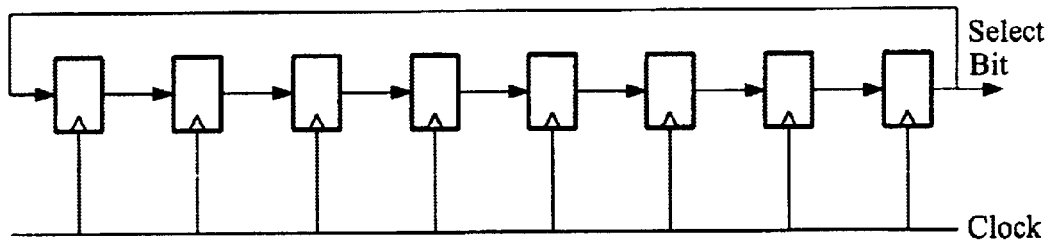
FIG. 5A shows the details of a rotating shift register which may be used for the FIG. 4 control portion.

Using rotating shift registers for N bits for the shift registers 41 and 42 allow the N reconfigurations to be dynamically performed until the next reprogramming of the shift registers. An N-configuration programmable shift register can be programmed with any number of configurations from 1 through N. The first configuration is stored in the first latch as control Select Bit1 of the shift register, the second configuration is stored in the second latch as control Select Bit2 of the shift register, and so on. When a clock line is asserted to the latches of the shift register, each latch changes its stored value to the stored value of the next higher bit latch (e.g., control Select Bit1 in latch 1 becomes the value of control Select Bit2 previously held in latch 2, control Select Bit2 in latch 2 becomes the value of control Select Bit3 previously held in latch 3, and so on). The value in the latch of the Most Significant Bit (control Select Bit8, for example) becomes the value in the latch of the Least Significant Bit (control Select Bit1 previously held in latch 1). The clock line may be driven by an actual clock signal, or alternatively, it may be asserted by other control logic. An 8-configuration programmable shift register is illustrated in FIG. 5A.

In the case where fewer than N configurations are to be programmed, modifications to the simple rotating shift register are made. If the number of desired configurations is a factor of N (e.g., 4 desired configurations are a factor of an 8-configuration programmable shift register), the desired configurations are replicated in a serial fashion to fill the programmable shift register.

Figure 5B:
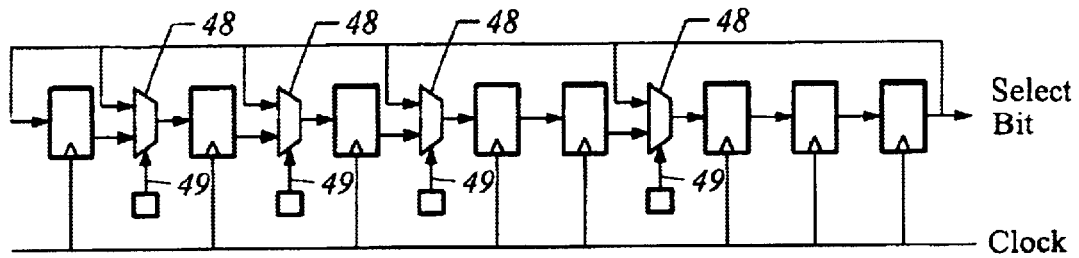
FIG. 5B shows the details of a configurable rotating shift register which might also be used for the FIG. 4 control portion, according to another embodiment of the present invention.

When the number of desired configurations is not a factor of N (e.g., 3 desired configurations are not a factor of an 8-configuration programmable shift register), the programmable shift register can be configured so that the Least Significant Bit is fed back into the desired Most Significant Bit (e.g., Bit3 for 3 desired configurations). The programmable shift register is initialized by setting the contents of each bit in the shift register, and by setting the contents of the internal multiplexer configuration bits to select the desired Most Significant Bit. After initialization, the programmable shift register cycles autonomously whenever its clock line is asserted. FIG. 5B illustrates an 8-configuration programmable shift register with internal multiplexers 48 feeding latches for Bit3, Bit5, Bit6 and Bit7. The control selection signals 49 into the multiplexers 48 permit selection of the Most Significant Bit and the number of desired configurations.

A non-autonomous mode can also be supported by using the shift register as a First-In First-Out (FIFO) buffer. In this mode, higher level control logic, not part of this invention, write its required configuration to the MSB (Most Significant Bit) of the shift register.

Besides programmable latches, the control portion of the programmable interface can be provided by an FPGA core which can be programmed as a state machine to provide the control Select Bits to one or more programmable interfaces of other embedded FPGA cores. Hence the first FPGA core can provide dynamic reconfiguration of the programmable interfaces during operation of the integrated circuit and can be reprogrammed when the other FPGA cores are reprogrammed.

Figure 6:
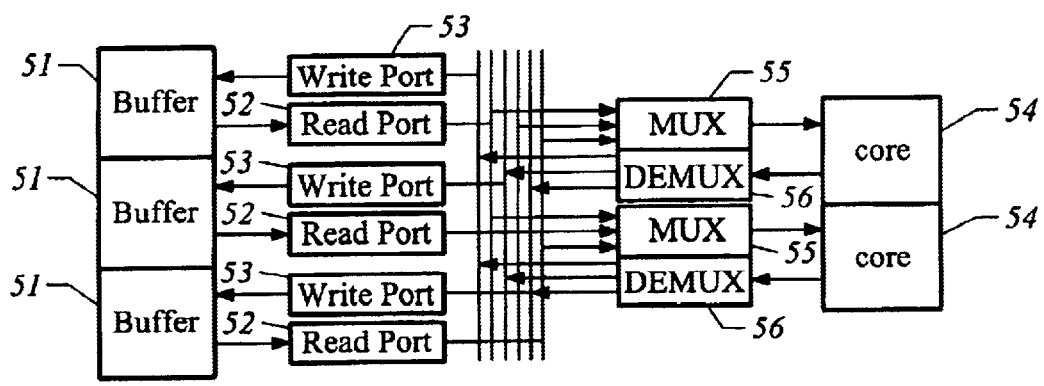
FIG. 6 illustrates an interconnection between FPGA cores and buffer memory blocks with programmable interfaces.
Figure 7:
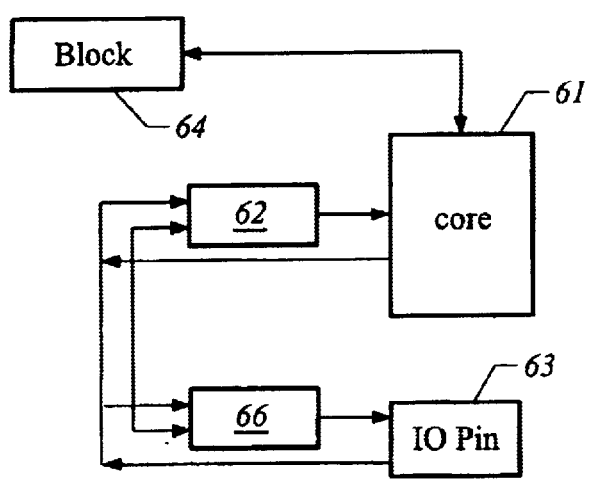
FIG. 7 illustrates an interconnection between an FPGA core and an input/output pin with a programmable interface.

It should be evident that the described programmable interface has many applications. Some exemplary applications with the FPGA core programmable interface of the present invention are illustrated in FIGS. 6 and 7. In FIG. 6 the programmable interface are located between FPGA cores and memory, i.e., the functional circuit blocks are in the form of buffer memory blocks such might be found in a wireless or network ASIC. The buffer memory blocks are divided as banks 51 and each bank 51 has a single read port 52 and a single write port 53. In this example, each FPGA core 54 has a single read port in the form of demultiplexer interface 56 and a single write port in the form of a multiplexer interface 55. The actual number of ports are specific to the application. The multiplexers of the interfaces are set once during initialization and remain the same throughout the application, though in a CPU-based ASIC, a function to support dynamic scheduling and allocation of the FPGA core-memory bank channels, either under user control at compile time or under automatic control at runtime, should be possible.

With control of the interconnect multiplexers in the interfaces 55 and 56 as described with respect to FIGS. 3 and 4, even dynamic memory operations such as ping-pong, scatter-gather, etc., are possible. In a ping-pong implementation, each FPGA core alternates between two memory banks. After an FPGA core has finished processing the data of one memory bank, the core passes that memory bank off to another FPGA core, and then processes the data of a new memory bank passed from the other FPGA core.

The programmable interface has been described with respect to connections between functional circuit blocks and FPGA cores. The FPGA core programmable interfaces may also be used for different connections. For instance, FPGA cores might be connected to one or more input/output (IO) pins of an ASIC through programmable interfaces. As shown in FIG. 7, the input to an FPGA core 61 is selectably connected by an interface 62 to an IO pin 63. (A connection between the FPGA core 61 and a functional circuit block 64 is also shown to exemplify the connection of the core to the rest of the integrated circuit.) If the ASIC has a CPU, that unit can make the selection of the pin(s) upon initialization of the integrated circuit and then change the connection to the functional circuit block 64 for operations. With a multiplexer 66 for the pin 63, the CPU can also control the off-loading of the FPGA core 61 through the pin 63. In implementation, only specific pins are able to be connected to the FPGA core(s) and the pin assignment are application-specific.

Hence it should be evident that the programmable interface has many applications. The programmable interface makes the integrated circuits with embedded FPGA cores more flexible in application in a cost-efficient manner. Furthermore, the interface provides for features which are not available in integrated circuits with FPGA cores with traditional hard-wired interconnections.

While the foregoing is a complete description of the embodiments of the invention, it should be evident that various modifications, alternatives and equivalents may be made and used. Accordingly, the above description should not be taken as limiting the scope of the invention which is defined by the metes and bounds of the appended claims.

What is claimed is:

1. In an integrated circuit having an embedded FPGA core, a programmable interface for said embedded FPGA core, said programmable interface comprising
   at least one multiplexer connected to said FPGA core and to a plurality of elements of said integrated circuit, said multiplexer selectably connecting said FPGA core to one of said elements; and
   a programmable control portion connected and providing selection bits to said one multiplexer so that reprogramming said control portion changes said multiplexer to connect said FPGA core to another of said plurality of elements.

2. The programmable interface of claim 1 wherein said programmable control portion comprises at least one programmable latch.

3. The programmable interface of claim 2 wherein said control portion comprises
   a plurality of programmable latches, each of said plurality of programmable latches holding a plurality of selection bits; and
   a second multiplexer connected to said plurality of programmable latches and said at least one multiplexer so that said second multiplexer responsive to control signals selects a plurality of selection bits in one of said plurality of programmable latches as control bits to said at least one multiplexer.

4. The programmable interface of claim 3 wherein said control portion further comprises a counter connected to said second multiplexer, said second multiplexer selecting a plurality of selection bits in another of said plurality of programmable latches as said counter changes.

5. The programmable interface of claim 4 wherein said counter is connected to a clock line so that said counter changes responsive to signals on said clock line.

6. The programmable interface of claim 2 wherein said control portion comprises
   a plurality of shift registers providing selection bits to said one multiplexer so that said at least one multiplexer changes as said plurality of shift registers shift to connect said FPGA core to another of said plurality of elements.

7. The programmable interface of claim 6 wherein each of said plurality of shift registers provides one of said selection bits to said one multiplexer.

8. The programmable interface of claim 7 wherein each of said plurality of shift registers comprises a rotating shift register so that said plurality of shift registers provides a cyclically repeating combination of selection bits to said one multiplexer.

9. The programmable interface of claim 8 wherein said plurality of shift registers are connected to a clock line so that said shift registers shift responsive to signals on said clock line.

10. The programmable interface of claim 1 wherein said programmable control portion comprises a second FPGA core.

11. The programmable interface of claim 1 wherein at least one of said elements comprises a functional circuit block.

12. The programmable interface of claim 11 wherein at least two of said elements comprise buffer memory blocks.

13. The programmable interface of claim 11 wherein at least one of said elements comprises a second FPGA core.

14. The programmable interface of claim 1 wherein at least one of said elements comprises an input/output pin.

15. For an integrated circuit having an embedded FPGA core, a programmable interface for said embedded FPGA core, said programmable interface connected to said FPGA core and to a plurality of elements of said integrated circuit, said programmable interface capable of selectably connecting said FPGA core to one of said elements in different connection configurations responsive to selection bits held in at least one programmable latch, a method of defining said different connection configurations comprising loading said selection bits into said at least one programmable latch in the same operation of loading configuration bits into said integrated circuit to program said FPGA core.

16. The method of claim 15 wherein at least one of said elements comprises a functional circuit block.

17. The method of claim 16 wherein at least two of said elements comprise buffer memory blocks.

18. The method of claim 16 wherein at least one of said elements comprises a second FPGA core.

19. The method of claim 15 wherein at least one of said elements comprises an input/output pin.

20. For an integrated circuit having a first embedded FPGA core, a programmable interface for said first embedded FPGA core, said programmable interface connected to said first FPGA core and to a plurality of elements of said integrated circuit, said programmable interface capable of selectably connecting said first FPGA core to one of said elements in different connection configurations responsive to selection bits from a second embedded FPGA core, a method of defining said different connection configurations comprising loading configuration bits into said integrated circuit to program said second embedded FPGA core in the same operation of loading configuration bits into said integrated circuit to program said first embedded FPGA core.

21. The method of claim 20 wherein at least one of said elements comprises a functional circuit block.

22. The method of claim 21 wherein at least two of said elements comprise buffer memory blocks.

23. The method of claim 20 wherein at least one of said elements comprises a third embedded FPGA core.

24. The method of claim 21 wherein at least one of said elements comprises an input/output pin.

* * * * *